United States Patent [19]

Tanaka et al.

[11] 4,235,985
[45] Nov. 25, 1980

[54] POLYMER FOR CONTACT LENS AND CONTACT LENS MADE THEREOF

[75] Inventors: Kyoichi Tanaka; Kouzou Takahashi, both of Nagoya; Mitsuhiro Kanada, Aichi; Yasuyuki Kato, Kasugai; Masuji Ichihara, Aichi, all of Japan

[73] Assignee: Toyo Contact Lens Co., Ltd., Aichi, Japan

[21] Appl. No.: 944,843

[22] Filed: Sep. 22, 1978

[30] Foreign Application Priority Data

Jul. 15, 1978 [JP] Japan .................................. 53-86537

[51] Int. Cl.³ .................... C08F 230/08; G02C 7/04
[52] U.S. Cl. ................................. 526/279; 351/160 R
[58] Field of Search .................... 526/279; 351/160 R

[56] References Cited

U.S. PATENT DOCUMENTS

| | | | |
|---|---|---|---|
| 4,056,496 | 11/1977 | Mancini et al. | 526/320 |
| 4,120,570 | 10/1978 | Gaylord | 526/279 |
| 4,139,513 | 2/1979 | Tanaka et al. | 260/29.6 TA |
| 4,139,692 | 2/1979 | Tanaka et al. | 526/218 |

FOREIGN PATENT DOCUMENTS 52-33502 8/1977 Japan.

*Primary Examiner*—Harry Wong, Jr.

*Attorney, Agent, or Firm*—Armstrong, Nikaido, Marmelstein & Kubovcik

[57] ABSTRACT

A polymerization product suitable for contact lenses comprising (a) an organosiloxane monomer having the following general formula

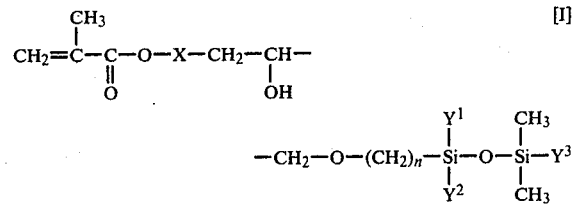

wherein n is an integer of 1 to 3, X is $-(CH_2)_p-O\!\!\!\!-_q$ in which p is an integer of 2 to 4 and q is 0 or an integer of 1 to 3, and $Y^1$, $Y^2$ and $Y^3$ are methyl group or $-O-Si-(CH_3)_3$, and (b) a hydrophobic methacrylic acid alkyl ester monomer. The polymerization product and crosslinked polymerization product have excellent oxygen permeability and proper hydrophilic property and are substantially water-nonabsorptive, and contact lenses made thereof can be comfortably worn continuously for a long period of time.

11 Claims, No Drawings

POLYMER FOR CONTACT LENS AND CONTACT LENS MADE THEREOF

BACKGROUND OF THE INVENTION

The present invention relates to novel copolymers suitable for preparing contact lenses and contact lenses made thereof which do not substantially absorb water and have an excellent oxygen permeability enough to wear them continuously for a long period of time.

Contact lenses put presently on the market are classified into two large groups of water-nonabsorptive contact lenses and water-absorptive contact lenses. The water-nonabsorptive contact lenses are further classified into hard contact lenses made of polymethyl methacrylate and soft contact lenses made of silicone rubber. Also, as the water-absorptive contact lenses, soft contact lenses made of poly-2-hydroxyethyl methacrylate, and high water content contact lenses made of polyvinyl pyrrolidone are known.

The water-nonabsorptive hard contact lenses made of polymethyl methacrylate have a history of several tens of years, but are still insufficient for use in a clinical viewpoint. That is to say, although such contact lenses have excellent optical property and durability, they give a strong foreign body sensation to persons in an early stage of the wear due to being poor in hydrophilic property of the lens surface and, therefore, require a long term for accommodation to the lenses. Moreover, since the oxygen permeability is poor, it is impossible to wear them continuously for a long period.

The silicone rubber soft contact lenses are very water-repellent and are greatly different from cornea in thermal properties such as thermal conductivity and thermal diffusivity. Therefore, they give a foreign body sensation, particularly a burning sensation, despite of having a very large oxygen permeability. A stronger patience than the case of polymethyl methacrylate lenses is required for accommodating thereto. Also, silicone rubber is soft and elastic, and precise mechanical treatments such as cutting, grinding and polishing are very difficult. On the other hand, many attempts to make the surface of silicone rubber lenses hydrophilic have been reported, but satisfactory silicone rubber contact lens has never been developed.

The water-absorptive contact lenses made of poly-2-hydroxyethyl methacrylate are good in a sensation of wear, but since the water content of the lens is at most 40% by weight, the permeation of oxygen through water as a medium is insufficient and it is impossible to continuously wear the lenses for a long period of time.

The high water content contact lenses made of polyvinyl pyrrolidone have an excellent oxygen permeability. However, they have the disadvantages that the durability is poor, and also that the water content of the lens changes depending on external environment at the time of wearing the lenses and the lens contour changes with the change of the water content so as to lower the visual correction ability.

Also, there is a serious problem in these water-absorptive contact lenses that they are contaminated by bacteria. Although boiling treatment, chemical sterilization treatment, etc. are considered as a means for preventing the contamination by bacteria, these treatments are troublesome. Moreover, the boiling treatment accelerates the deterioration in quality of lens material and the chemical sterilization treatment incurs danger to eyes.

As stated above, conventional contact lenses have various defects, and a contact lens having no such defects are desired.

SUMMARY OF THE INVENTION

The present invention provides a novel polymerization product suited for contact lenses comprising (a) 30% to 95% by weight of an organosiloxane monomer having the following general formula [I]:

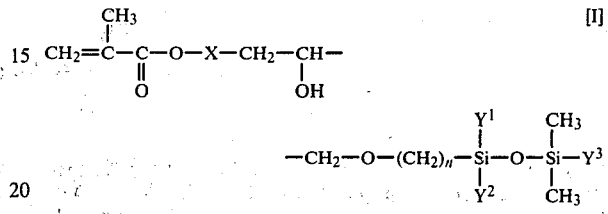

wherein n is an integer of 1 to 3, X is $-[(CH_2)_p-O]_q-$ in which p is an integer of 2 to 4 and q is 0 or an integer of 1 to 3, and $Y^1$, $Y^2$ and $Y^3$ are methyl or $-O-Si-(CH_3)_3$, and (b) 70% to 5% by weight of a hydrophobic methacrylic acid alkyl ester monomer, of which homopolymer has a glass transition temperature higher than room temperature. The polymerization product which is crosslinked is also useful as a contact lens material.

The polymerization product has an excellent oxygen permeability and a proper hydrophilic property and is substantially water-nonabsorptive and, therefore, the contact lenses prepared therefrom have an excellent optical property and can be safely, comfortably worn continuously for a long period of time without giving a foreign body sensation and being not contaminated by bacteria.

DETAILED DESCRIPTION

Compounds employed as an organosiloxane monomer in the present invention, having the following general formula [I]:

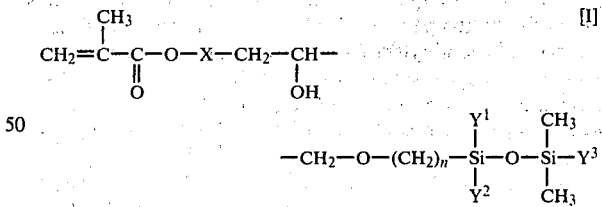

wherein n is an integer of 1 to 3, X is $-[(CH_2)_p-O]_q-$ in which p is an integer of 2 to 4 and q is 0 or an integer of 1 to 3, and $Y^1$, $Y^2$ and $Y^3$ are methyl group or $-O-Si-(CH_3)_3$, are novel compounds.

It is known that silicone rubber has an excellent oxygen permeability, and as disclosed in Japanese Patent Publication No. 33502/1977 that the utilization of an alkylsiloxy group is an available means for increasing the oxygen permeability.

In contrast to such a known art, the feature of the present invention lies in the use of particular methacrylic acid ester derivatives having not only alkylsiloxy groups, but also hydrophilic groups, their molecules. That is to say, each of the organosiloxane monomers shown by the general formula [I] has a hydroxyl group which is a hydrophilic group, and some of them have also a polyether group which is a hydrophilic group. This has a very significant meaning in adaptation of the obtained copolymers as contact lens materials.

As noted above, it is useful to utilize the alkylsiloxy group in increasing the oxygen permeability, but the obtained polymer shows undesirable water repelling property with increase of the number of the alkylsiloxy groups in the polymer. For instance, a polymer consisting essentially of polysiloxanylalkyl ester of acrylic or

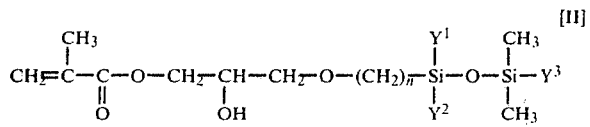

wherein n is an integer of 1 to 3, and $Y^1$, $Y^2$ and $Y^3$ are methyl group or $-O-Si-(CH_3)_3$, polysiloxanyl(alkylglycerol)alkyleneglycol monomethacrylates having the following general formula [III]:

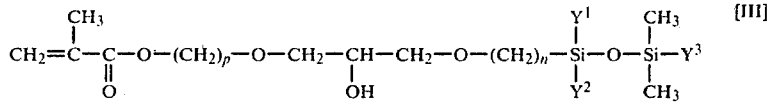

methacrylic acid having no hydrophilic group as disclosed in Japanese Patent Publication No. 33502/1977 has a very strong water repelling property, and is not suitable for contact lens materials in spite of having high oxygen permeability. In order to offset this effect, the wherein n is an integer of 1 to 3, p is an integer of 2 to 4, and $Y^1$, $Y^2$ and $Y^3$ are methyl group or $-O-Si(CH_3)_3$, and polysiloxyanyl(alkylglycerol)polyalkyleneglycol monomethacrylates having the following general formula [IV]:

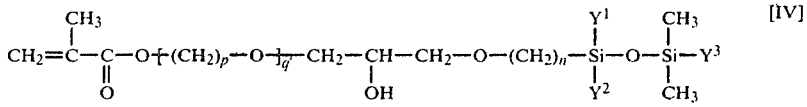

polysiloxanylalkyl ester monomer may be copolymerized with a hydrophilic monomer to provide the obtained copolymer with a proper hydrophilic property, but since it is hard to copolymerize with the hydrophilic monomer, the copolymer is liable to become opaque. This is a fatal defect for use as contact lens materials. Therefore, the polymerization ratio of the hydrophilic monomer to the polysiloxanylalkyl ester monomer is limited to produce a transparent copolymer, and it is very difficult to decrease the water repelling property by copolymerizing with a hydrophilic monomer. In case of such a polysiloxanylalkyl ester monomer, when the water repelling property is repressed by reducing the number of the alkylsiloxy groups in the obtained polymer, the oxygen permeability becomes low, and then the oxygen permeability is raised by increasing the number of the alkylsiloxy groups in the obtained polymer, the water repelling property becomes strong. In any case, there cannot be obtained a polymer suited for preparing a contact lens which can be comfortably worn continuously for a long period of time.

On the other hand, according to the present invention, it is possible to obtain polymers having an excellent hydrophilic property and moreover a high oxygen permeability without copolymerization with a hydrophilic monomer, since the compounds of the general formula [I] employed in the present invention have a hydrophilic hydroxyl group and some of them further have a polyether group which is hydrophilic group. Therefore, contact lenses which can be comfortably worn continuously for a long period of time can be obtained from the polymers obtained according to the present invention.

The novel compounds of the general formula [I] employed in the present invention are classified into the following three types;

polysiloxanyl(alkylglycerol)monomethacrylates having the following general formula [II]:

wherein n is an integer of 1 to 3, p is an integer of 2 to 4, q' is 2 or 3, and $Y^1$, $Y^2$ and $Y^3$ are methyl group or $-O-Si-(CH_3)_3$.

These particular organosiloxane monomers shown by the general formulas [II], [III] and [IV] are prepared by reacting a polysiloxanylalkyloxypropylene oxide with methacrylic acid, an alkyleneglycol monomethacrylate or a polyalkyleneglycol monomethacrylate. For instance, polysiloxanyl(alkylglycerol) monomethacrylates shown by the general formula [II] are prepared as follows:

One mole of the polysiloxanylalkyloxypropylene oxide having the following general formula [VII]:

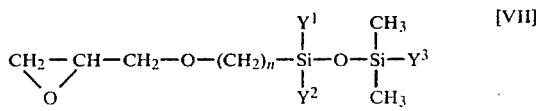

wherein n is an integer of 1 to 3, and $Y^1$, $Y^2$ and $Y^3$ are methyl group or $-O-Si-(CH_3)_3$, 2 moles of methacrylic acid, about 0.1 mole of potassium hydroxide and about 0.01 mole of hydroquinone or hydroquinone monomethyl ether are added to a reaction vessel, and the reaction is then carried out at a temperature of 80° to 105° C. for 8 to 24 hours with agitation. When the reaction temperature is high, the reaction is complete in about 10 hours, but by-products are increased. On the other hand, when the reaction temperature is low, it is required to conduct the reaction for about 30 hours, but by-products are reduced. Since the desired reaction product has a high boiling point and is polymerizable, it is difficult to remove the by-products by distillation and, therefore, it is desirable to conduct the reaction at a temperature in the vicinity of 90° C. for more than 20 hours. After the completion of the reaction, the reaction mixture is allowed to cool and is filtered. The filtrate is then dissolved in n-hexane and is washed several times with a 0.5 N aqueous solution of sodium hydroxide by employing a separatory funnel until the aqueous solution becomes colorless, and after further washing with a siline water until it shows neutral, is dehydrated for a day and night by empolying a drying agent such as anhydrous sodium sulfate. After removing anhydrous sodium sulfate by filtration, n-hexane is distilled away, for instance, by means of an evaporator to give the desired reaction product. When the thus obtained reaction product is still tinged with yellow, the product is preferably further treated with active carbon. The identification of the product is conducted by means of gas chromatography, elemental analysis, infrared spectroscopy, etc. The polysiloxanyl-(alkylglycerol)alkyleneglycol monomethacrylates shown by the general formula [III] and polysiloxanyl-(alkylglycerol)polyalkyleneglycol monomethacrylate shown by the general formula [IV] are prepared in the same manner as the above, respectively by employing an alkyleneglycol monomethacrylate for the former and a polyalkyleneglycol monomethacrylate for the latter instead of methacrylic acid.

Examples of the polysiloxanyl(alkylglycerol) monomethacrylates of the general formula [II] employed in the present invention are pentamethyldisiloxanyl(methylglycerol)monomethacrylate, pentamethyldisiloxanyl(ethylglycerol)monomethacrylate, pentamethyldisiloxanyl(propylglycerol)monomethacrylate [these compounds being expressed as pentamethyldisiloxanyl-(methylglycerol, ethylglycerol or propylglycerol)monomethacrylate, and hereinafter the name of compounds being expressed in the same manner], heptamethyltrisiloxanyl-(methylglycerol, ethylglycerol or propylglycerol)monomethacrylate, methyldi(trimethylsiloxy)sylyl-(methylglycerol, ethylglycerol or propylglycerol)monomethacrylate, tris(trimethylsiloxy)sylyl-(methylglycerol, ethylglycerol or propylglycerol)-monomethacrylate, and pentamethyldisiloxydi(trimethylsiloxy)sylyl-(methylglycerol, ethylglycerol or propylglycerol)monomethacrylate.

Examples of the polysiloxanyl(alkylglycerol)alkyleneglycol monomethacrylates employed in the present invention are pentamethyldisiloxanyl-(methylglycerol, ethylglycerol or propylglycerol)-ethyleneglycol monomethacrylate, heptamethyltrisiloxanyl-(methylglycerol, ethylglycerol or propylglycerol)-ethyleneglycol monomethacrylate, methyldi(trimethylsiloxy)sylyl-(methylglycerol, ethylglycerol or propylglycerol)-ethyleneglycol monomethacrylate, tris(trimethylsiloxy)sylyl-(methylglycerol, ethylglycerol or propylglycerol)-ethyleneglycol monomethacrylate, pentamethyldisiloxydi(trimethylsiloxy)sylyl-(methylglycerol, ethylglycerol or propylglycerol)-ethyleneglycol monomethacrylate, pentamethyldisiloxanyl-(methylglycerol, ethylglycerol or propylglycerol)-propyleneglycol monomethacrylate, heptamethyltrisiloxanyl-(methylglycerol, ethylglycerol or propylglycerol)-propyleneglycol monomethacrylate, methyldi(trimethylsiloxy)sylyl-(methylglycerol, ethylglycerol or propylglycerol)-propyleneglycol monomethacryate, tris(trimethylsiloxy)sylyl-(methylglycerol, ethylglycerol or propylglycerol)-propyleneglycol monomethacrylate, pentamethyldisiloxydi(trimethylsiloxy)sylyl-(methylglycerol, ethylglycerol or propylglycerol)-propyleneglycol monomethacrylate, pentamethyldisiloxanyl-(methylglycerol, ethylglycerol or propylglycerol)-butyleneglycol monomethacrylate, heptamethyltrisiloxanyl-(methylglycerol, ethylglycerol or propylglycerol)-butyleneglycol monomethacrylate, methyldi(trimethylsiloxy)sylyl-(methylglycerol, ethylglycerol or propylglycerol)-butyleneglycol monomethacrylate, tris(trimethylsiloxy)sylyl-(methylglycerol, ethylglycerol or propylglycerol)-butyleneglycol monomethacrylate, and pentamethyldisiloxydi(trimethylsiloxy)sylyl-(methylglycerol, ethylglycerol or propylglycerol)-butyleneglycol monomethacrylate.

Examples of the polysiloxanyl(alkylglycerol)polyalkyleneglycol monomethacrylate employed in the present invention are pentamethyldisiloxanyl-(methylglycerol, ethylglycerol or propylglycerol)-diethylenglycol monomethacrylate, heptamethyltrisiloxanyl-(methylglycerol, ethylglycerol or propylglycerol)-diethyleneglycol monomethacrylate, methyldi(trimethylsiloxanyl)sylyl-(methylglycerol, ethylglycerol or propylglycerol)-diethyleneglycol monomethacrylate, tris(trimethylsiloxy)sylyl-(methylglycerol, ethylglycerol or propylglycerol)-diethyleneglycol monomethacrylate, pentamethyldisiloxydi(trimethylsiloxy)sylyl-(methylglycerol, ethylglycerol or propylglycerol)-diethyleneglycol monomethacrylate, pentamethyldisiloxanyl-(methylglycerol ethylglycerol or propylglycerol)-triethyleneglycol monomethacrylate, heptamethyltrisiloxanyl-(methylglycerol, ethylglycerol or propylglycerol)-triethyleneglycol monomethacrylate, methyldi(trimethylsiloxy)sylyl-(methylglycerol, ethylglycerol or propylglycerol)-triethyleneglycol monomethacrylate, tris(trimethylsiloxy)sylyl-(methylglycerol, ethylglycerol or propylglycerol)-triethyleneglycol monomethacrylate, pentamethyldisiloxydi(trimethylsiloxy)sylyl-(methylglycerol, ethylglycerol or propylglycerol)triethyleneglycol monomethacrylate, pentamethyldisiloxanyl(methylglycerol, ethylglycerol or propylglycerol)dipropyleneglycol monomethacrylate, heptamethyltrisiloxanyl(methylglycerol, ethylglycerol or propylglycerol)dipropyleneglycol monomethacrylate, methyldi(trimethylsiloxy)sylyl-(methylglycerol, ethylglycerol or propylglycerol)dipropyleneglycol monomethacrylate, tris(trimethylsiloxy)sylyl-(methylglycerol, ethylglycerol or propylglycerol)dipropyleneglycol monomethacrylate, pentamethyldisiloxydi(trimethylsiloxy)sylyl-(methylglycerol, ethylglycerol or propylglycerol)-dipropyleneglycol monomethacrylate, pentamethyldisiloxanyl-(methylglycerol, ethylglycerol or propylglycerol)-tripropyleneglycol monomethacrylate, heptamethyltrisiloxanyl-(methylglycerol, ethylglycerol or propylglycerol)-tripropyleneglycol monomethacrylate, methyldi(trimethylsiloxy)sylyl-(methylglycerol, ethylglycerol or propylglycerol)-tripropyleneglycol monomethacrylate, tris(trimethylsiloxy)sylyl-(methylglycerol, ethylglycerol or propylglycerol)-tripropyleneglycol monomethacrylate, pentamethyldisiloxanyl-(methylglycerol, ethylglycerol or propylglycerol)-dibutyleneglycol monomethacrylate, heptamethyltrisiloxanyl-(methylglycerol, ethylglycerol or propylglycerol)-dibutyleneglycol monomethacrylate, methyldi(trimethylsiloxy)sylyl-(methylglycerol, ethylglycerol or propylglycerol)-dibutyleneglycol monomethacrylate, tris(trimethylsiloxy)sylyl-(methylglycerol, ethylglycerol or propylglycerol)-dibutyleneglycol monomethacrylate, pentamethyldisiloxydi(trimethylsiloxy)sylyl-(methylglycerol, ethylglycerol or propylglycerol)-dibutyleneglycol monomethacrylate, pentamethyldisiloxanyl-(methylglycerol, ethylglycerol or propylglycerol)-tributyleneglycol monomethacrylate, heptamethyltrisiloxanyl-(methylglycerol, ethylglycerol or propylglycerol)-tributyleneglycol monomethacrylate, methyldi(trimethylsiloxy)sylyl-(methylglycerol, ethylglycerol or propylglycerol)-tributyleneglycol monomethacrylate, tris(trimethylsiloxy)sylyl-(methylglycerol, ethylglycerol or propylglycerol)-tributyleneglycol monomethacrylate, and pentamethyldisiloxydi(trimethylsiloxy)sylyl-(methylglycerol, ethylglycerol or propylglycerol)tributyleneglycol monomethacrylate.

The organosiloxane monomers may be employed singly or in admixture thereof. In the present invention, it is necessary to employ the organosiloxane monomer in an amount of 30% to 95% by weight based on the total weight of the monomers employed. When the amount of the organosiloxane monomer is less than the above range, the oxygen permeability of the obtained copolymer becomes low, and when the amount is larger than the above range, the obtained copolymer tends to lack in stiffness and mechanical processing property such as cutting, grinding and polishing.

The organosiloxane monomer is copolymerized with a hydrophobic monomer to provide the obtained copolymer with the stiffness and mechanical processing property. As the hydrophobic monomer, there are employed a methacrylic acid alkyl ester of which homopolymer has a glass transition temperature higher than room temperature. Examples of the hydrophobic methacrylic acid alkyl ester monomer employed in the present invention are methyl methacrylate, ethyl methacrylate and cyclohexyl methacrylate. These hydrophobic monomer may be employed singly or in admixture thereof. The amount of the hydrophobic monomer is selected from 5% to 70% by weight, preferably from 10% to 60% by weight, based on the total weight of the monomers employed. When the amount of the hydrophobic monomer is less than the above range, it is difficult to raise the mechanical processing property and stiffness, and when the amount is larger than the above range, the copolymer having an sufficient oxygen permeability cannot be obtained.

For the purpose of improving the solvent resistance and shape stability of contact lenses prepared from the copolymers of the invention, the copolymers may be cross-linked in a conventional manner. In general, in order to make the copolymer possess the cross-linked structure, the polymerization of the organosiloxane monomer and the hydrophobic monomer is carried out in the presence of a cross-linking agent. Particularly, it is desirable to employ a polyfunctional monomer as the cross-linking agent which is previously added to the polymerization system, and then the polymerization is carried out. As the polyfunctional monomer employed in the present invention, in addition to known cross-linking agents generally employed in the polymerization of a vinyl monomer, such as ethylene glycol diacrylate, ethylene glycol dimethacrylate, diethylene glycol diacrylate, diethylene glycol dimethacrylate, triethylene glycol diacrylate, triethylene glycol dimethacrylate, allyl methacrylate, trimethylolpropane trimethacrylate, divinyl benzene and diallyl phthalate, there are preferably employed polyfunctional monomers having siloxane bond, namely a polysiloxanylbis(alkylglycerol acrylate) and polysiloxanylbis(alkylglycerol methacrylate) having the following general formula [V]:

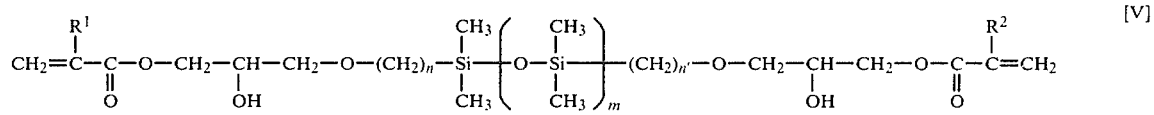

wherein n and n' are an integer of 1 to 3, m is 1 or 2, and $R^1$ and $R^2$ are hydrogen or methyl group, and a polysiloxanylbis(alkyl acrylate) and polysiloxanylbis(alkyl methacrylate) having the following general formula [VI]:

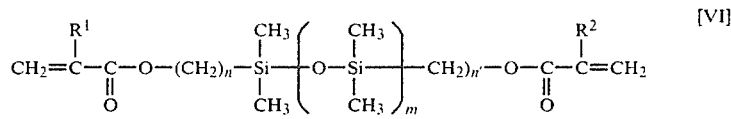

wherein n and n' are an integer of 1 to 3, m is 1 or 2, and $R^1$ and $R^2$ are hydrogen or methyl group.

Since these cross-linking agents of the general formulas [V] and [VI] have siloxane bonds in their molecules, the oxygen permeability of the obtained cross-linked copolymers is high and, therefore, they are preferably employed in the present invention. The polysiloxanylbis(alkylglycerol acrylate) and polysiloxanylbis(alkylglycerol methacrylate) of the general formula [V] have not only a siloxane bond, but also hydroxyl groups which are hydrophilic groups. Therefore, since the hydrophilic property of the obtained cross-linked copolymers can also be maintained, the materials are particularly useful.

The polysiloxanylbis (alkylglycerol acerylate) and polysiloxanylbis (alkylglycerol methacrylate) of the formula [V] are novel compounds, and are prepared, for instance, by the following method.

One mole of a polysiloxanylbis (alkyloxypropylene oxide) having the following general formula [VIII]:

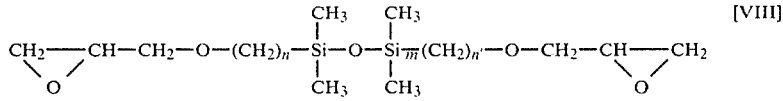

wherein n and n' are an integer of 1 to 3, and m is 1 or 2, 3 moles of acrylic or methacrylic acid, about 0.2 mole of potassium hydroxide and about 0.02 mole of hydroquinone or hydroquinone monomethyl ether are added to a reaction vessel, and the reaction is then carried out at a temperature of 80° to 100° C. for 10 to 30 hours with agitation. After the completion of the reaction, the reaction mixture is allowed to cool and is filtered to remove the precipitated potassium acrylate or methacrylate. The filtrate is then dissolved in n-hexane and is washed several times with 0.5 N aqueous solution of sodium hydroxide by employing a separatory funnel until the aqueous solution becomes colorless. When the filtrate is hard to dissolve in n-hexane, the filtrate may be washed as it is or after dissolving in an ether. After further washing the filtrate with a saline water until it showns neutral, the filtrate is dehydrated for a day and night by employing a drying agent such as anhydrous sodium sulfate. The drying agent is then removed by filtration, and n-hexane is distilled away, for instance, by means of an evaporator to give the desired product.

Examples of the cross-linking agent shown by the general formula [V] are tetramethyldisiloxanylbis(methylglycerol acrylate), tetramethyldisiloxanylbis(methylglycerol methacrylate) [hereinafter acrylate and methacrylate being referred to as (meth)acrylate], hexamethyltrisiloxanylbis(methylglycerol (meth)acrylate), tetramethyldisiloxanylbis (ethylglycerol (meth)acrylate), hexamethyltrisiloxanylbis(ethylglycerol (meth)acrylate), tetramethyldisiloxanylbis(propylglycerol (meth)acrylate), hexamethyltrisiloxanylbis(propylglycerol (meth)acrylate), tetramethyldisiloxanylmethylethyldiglycerol di(meth)acrylate, hexamethyltrisiloxanylmethylethyldiglycerol di(meth)acrylate, tetramethyldisiloxanylmethylpropyldiglycerol di(meth)acrylate, hexamethyltrisiloxanylmethylpropyldiglycerol di(meth)acrylate, tetramethyldisiloxanylethylpropyldiglycerol di(meth)acrylate, and hexamethyltrisiloxanylethylpropyldiglycerol di(meth)acrylate.

Examples of the cross-linking agent shown by the general formula [VI] are tetramethyldisiloxanylbis(methyl (meth)acrylate), hexamethyltrisiloxanylbis (methyl (meth)acrylate, tetramethyldisiloxanylbis(ethyl (meth)acrylate, hexamethyltrisiloxanylbis(ethyl (meth)acrylate), tetramethyldisiloxanylbis(propyl (meth)acrylate), hexamethyltrisiloxanylbis(propyl (meth)acrylate), tetramethyldisiloxanylmethylethyl di(meth)acrylate, hexamethyltrisiloxanylmethylethyl di(meth)acrylate, tetramethyldisiloxanylmethylpropyl di(mesh)acrylate, hexamethyltrisiloxanylmethylpropyl di(meth)acrylate, tetramethyldisiloxanylethylpropyl di(meth)acrylate, and hexamethyltrisiloxanylethylpropyl di(meth)acrylate.

The cross-linking agents may be employed singly or in admixture thereof. The amount of the cross-linking agent is selected from 0.5 to 25 parts by weight, preferably 1 to 20 parts by weight, per 100 parts by weight of the total amount of the organosiloxane monomer and hydrophobic monomer. When the amount of the cross-linking agent is less than the above range, the cross-linking does not sufficiently proceed, and when the amount is larger than the above range, the obtained copolymer is hard and fragile and is poor in mechanical processing property.

The polymerization of the monomers is carried out by employing free radical polymerization initiators which are conventionally employed in the polymerization of unsaturated hydrocarbons, such as benzoyl peroxide, azobisisobutyronitrile and azobisdimethylvaleronitrile. The polymerization initiator is usually employed in an amount of 0.03 to 0.30 part by weight to 100 parts by weight of the monomer mixture.

In the present invention, any polymerization systems are applicable, and the bulk polymerization is particularly preferred by the reason that the obtained copolymer can be directly employed as a material of contact lens as it is.

The polymerization is carried out in a conventional manner. For instance, in case of the polymerization using ultraviolet ray, the monomers are first polymerized under the untraviolet irradiation at a temperature of 15° to 50° C. for about 30 to about 40 hours, and then thermally polymerized without the ultraviolet irradiation at a temperature of 50° to 140° C. for about 30 to about 40 hours. In that case, the polymerization may be carried out by stepwise raising the temperature. For instance, the monomers are polymerized first at 15° C. for about 16 hours, and at 40° C. for about 8 hours and finally at 50° C. for about 8 hours under the ultraviolet irradiation, and then thermally polymerized without the ultraviolet irradiation at 60° C. for about 24 hours, at 80° C. for about 4 hours, at 100° C. for about 4 hours and at 120° C. for about 4 hours. Also, when carrying out the polymerization by only thermal polymerization technique, the polymerization is usually carried out at a temperature of 40° to 140° C. for about 60 to about 110 hours, and may be, of course, carried out stepwise. For instance, the polymerization is carried out first at 40° C. for about 64 hours, at 60° C. for about 24 hours, at 80° C. for about 4 hours and finally at 120° C. for about 4 hours. The polymerization of the monomers has been explained above with reference to some instances, but it is to be understood that the polymerization conditions are not limited to such temperature and time conditions and the use of ultraviolet ray.

The cast polymerization is suitable for preparing contact lenses. The polymerization may be conducted in a mold having a shape of contact lens by the bulk polymerization technique. Contact lenses having the desired shape are directly obtained in this manner. The thus obtained contact lenses may be further subjected to a usual mechanical processing to give precise contact lenses. Also, the polymerization may be conducted in an appropriate mold or vessel to give a contact lens material in the form of block, sheet or rod, and the contact lens material may be then mechanically treated in a conventional manner to give contact lenses of a desired shape.

The thus prepared copolymer has approximately the same composition as that of the monomers employed.

The copolymers of the present invention have an improved oxygen permeability as compared with a conventional polymethyl methacrylate lens material which is a typical material for water-nonabsorptive contact lens. For instance, the copolymer prepared by polymerizing 55 g. of methyldi(trimethylsiloxy)sylylpropylglycerol monomethacrylate, 40 g. of methyl methacrylate and 5 g. of ethylene glycol dimethacrylate has the oxygen permeability of about $12.5 \times 10^{-10}$ ml.cm./cm.$^2$sec.cmHg. On the other hand, the oxygen permeability of a polymethyl methacrylate lens material is about $0.05 \times 10^{-10}$ ml.cm./cm.$^2$sec.cmHg. Therefore, the copolymer of the invention containing about 55% by weight of methyldi(trimethylsiloxy)sylylpropylglycerol monomethacrylate has the oxygen permeability of about 250 times that of a conventional polymethyl methacrylate contact lens material. Also, a conventional poly-2-hydroxyethyl methacrylate lens material which is a lens material for water-absorptive contact lens has the oxygen permeability of about $5.6 \times 10^{-10}$ ml.cm./cm.$^2$sec.cmHg in a state of containing water in saturation and, therefore, the copolymer of the present invention has the oxygen permeability of about 2.2 times that of the poly-2-hydroxyethyl methacrylate lens material. This means that the copolymers of the present invention have the oxygen permeability necessary for enabling the contact lenses made thereof to be worn continuously for a long period of time, because it is reported that a poly-2-hydroxyethyl methacrylate contact lens having a thickness of 0.2 mm. can permeate oxygen of about ½ time the required oxygen. In fact, according to the present inventor's clinical study which contact lenses having a thickness of 0.15 mm., a size of 11.5 mm. and a radius of curvature of inner surface of 7.90 mm. were prepared from the copolymer of the invention and were continuously worn on albino rabbit eyes for 21 days, no change was observed on corneal surfaces and there was no decrease of glycogen, and also is respect of the histological observation, there was no vascularization, substantial edema and infiltration of inflammatory cells and like this, no morphologically significant change was observed. The reason that the continuous wear was conducted for 21 days is that it is known that the cycle of metabolism of the cornea is about 18 days.

The oxygen permeability of the copolymers of the present invention is in proportion to the content of the before-mentioned particular organosiloxane, and falls within the range of about $2.5 \times 10^{-10}$ to about $43 \times 10^{-10}$ ml.cm./cm.$^2$sec.cmHg. The refractive index of the copolymers of the present invention varies depending on the kind and amount of the employed monomers and is not critical, but usually falls within the range of $n_D{}^{25} = 1.40$ to 1.50. Also, the copolymers of the present invention have a specific gravity of from 1.01 to 1.21, a visible ray percent transmission of not less than 90% and a Vickers hardness number of 1.5 to 19.0.

The thus prepared copolymers and cross-linked copolymers of the present invention have an excellent oxygen permeability and good hydrophilic property. Therefore, the contact lenses prepared therefrom can be worn continuously for a long period of time without giving a foreign body sensation. Also, the copolymers and cross-linked copolymers of the invention are substantially water-nonabsorptive and, therefore, the contact lenses have an excellent optical property and there is no problem of contamination by bacteria.

It is proposed that in order to improve the hydrophilic property of contact lenses, the surface of the contact lens is applied with a wetting agent such as a dilute aqueous solution of an alkyldimethylbenzylammonium chloride, or is subjected to an electric discharge treatment or a chemical treatment with a strong oxidizing agent such as nitric acid. As stated before, the copolymers of the present invention have a good hydrophilic property and, therefore, require no such a treatment. However, the contact lenses of the present invention may be subjected to such treatments in order to further raise the hydrophilic property.

In the instant specification the values of the oxygen permeability, refractive index and visible ray percent transmission are those measured as follows:

The oxygen permeability is measured by an oxygen gas permeameter made by Rikaseiki Kogyo Co., Ltd. by employing specimens having a diameter of 15 mm. and a thickness of 0.2 mm.

The refractive index is measured by Abbé's refractometer made by Erma Optical Works Co., Ltd.

The visible ray percent transmission is measured by Double-Beam Spectro Photometer UV-210 made by Shimadzu Seisakusho Ltd. by employing film specimens having a thickness of 0.15 mm.

The present invention is more particularly described and explained by means of the following Examples. In order to illustrate the preparation of the organosiloxane monomer and the cross-linking agent having siloxane bond, the following Reference Examples are also presented.

REFERENCE EXAMPLES 1 to 3

[Synthesis of Polysiloxanyl(alkylglycerol) Monomethacrylate]

Methyldi(trimethylsiloxy)sylyl(propylglycerol) monomethacrylate having the following formula [IX]:

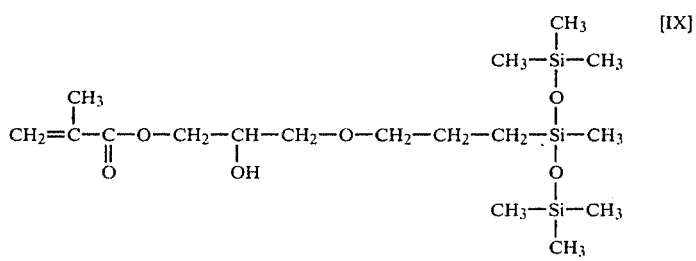

was prepared as follows:

A one liter four neck round bottom flask equipped with a stirrer, a thermometer, a tube for introducing nitrogen gas, a dropping funnel and a reflux condenser was charged with 336 g. of methyldi(trimethylsiloxy)-sylylpropyloxypropylene oxide, 6.5 g. of potassium hydroxide and 0.8 g. of hydroquinone, and was placed on an oil bath. With introducing nitrogen gas into the flask, 172 g. of methacrylic acid was added dropwise to the flask through the dropping funnel with stirring. After the completion of the addition, the mixture was gradually heated to 93° C. and at this temperature the reaction was carried out for about 22 hours. After the completion of the reaction, the reaction mixture was allowed to cool and filtered to remove the precipitated potassium methacrylate. The filtrate was then dissolved in n-hexane in an amount of about 10 times the volume of the filtrate and the resulting solution was washed several times with a 0.5 N aqueous solution of sodium hydroxide by empolying a separatory funnel, until the aqueous solution became colorless. The filtrate dissolved in n-hexane was further washed with a saline water until it became neutral, and was then dehydrated by employing anhydrous sodium sulfate for a day and night. After removing anhydrous sodium sulfate by filtration, n-hexane was distilled away by an evaporator.

The thus purified reaction product was a slightly viscous, transparent liquid. According to the quantitative analysis by gas chromatography, the purity of the obtained product was over 98%.

The refractive index $n_D^{25}$ of the product was 1.440.

The infrared absorption spectrum of the product indicated absorptions of ≡OH group at 3,420 cm.$^{-1}$, of double bond at 1,640 cm.$^{-1}$, of ester bond at 1,720 cm.$^{-1}$, of Si—O—Si bond at 1,080 cm.$^{-1}$ and 1,040 cm.$^{-1}$, of —CH$_3$ group at 2,950 cm.$^{-1}$, 1,400 cm.$^{-1}$ and 1,300 cm.$^{-1}$, and of —Si—(CH$_3$)$_3$ group at 845 cm.$^{-1}$ No absorption of epoxy group was observed at 910 cm.$^{-1}$.

The result of the elemental analysis was as follows:

Calculated for C$_{17}$H$_{38}$O$_6$Si$_3$: C 48.3%; H 9.0%. Found: C 49.7%; H 9.3%

From the above results, it was confirmed that the product was methyldi(trimethylsiloxy)sylyl(propylglycerol) monomethacrylate (hereinafter referred to as S$_2$) (Reference Example 2).

The procedures of Reference Example 2 were repeated except that instead of methyldi(trimethylsiloxy)-sylylpropyloxypropylene oxide, pentamethyldisiloxanylpropyloxypropylene oxide and tris(trimethylsiloxy)sylylpropyloxypropylene oxide were employed respectively to give pentamethyldisiloxanyl(propylglycerol) monomethacrylate (hereinafter referred to as S$_1$) (Reference Example 1) having the following formula [X]:

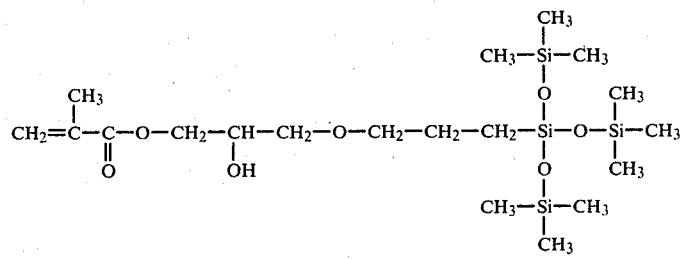

and tris(trimethylsiloxy)sylyl(propylglycerol) monomethacrylate (hereinafter referred to as S$_3$) (Reference Example 3) having the following formula [XI]:

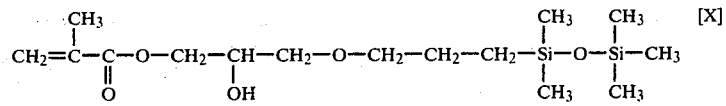

The analytical results of S$_1$ and S$_3$ compounds are shown in Table 1 together with the results of S$_2$ compound.

REFERENCE EXAMPLES 4 to 6

[Synthesis of Polysiloxanyl(alkylglycerol)alkyleneglycol Monomethacrylate]

Methyldi(trimethylsiloxy)sylyl(propylglycerol)ethyleneglycol monomethacrylate having the following formula [XII]:

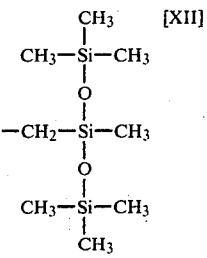

was prepared as follows:

A one liter four neck round bottom flask equipped with a stirrer, a thermometer, a tube for introducing nitrogen gas, a dropping funnel and a reflux condenser was charged with 260 g. of ethylene glycol monomethacrylate, 7 g. of triethylamine and 4 g. of hydroquinone. With introducing nitrogen gas into the flask, 336 g. of methyldi(trimethylsiloxy)sylylpropyloxypropylene oxide was added dropwise to the flask through the dropping funnel with stirring. The mixture was then gradually heated to 85° C. and at this temperature the reaction was carried out for about 6 hours. After the completion of the reaction, the reaction mixture was allowed to cool and then dissolved in a large quantity of n-hexane. The resulting solution was washed several times with a 0.5 N aqueous solution of sodium hydroxide by employing a separatory funnel until the aqueous solution became colorless, and was further washed with a saline water until it became neutral. After dehydrating by employing anhydrous sodium sulfate for a day and night and removing anhydrous sodium sulfate by filtration, n-hexane was removed by an evaporator.

The thus purified reaction product was a slightly viscous, transparent liquid. According to the quantitative analysis by gas chromatography, the purity of the obtained product was over 93%.

The refractive index $n_D^{25}$ of the product was 1.439.

The infrared absorption spectrum of the product indicated absorptions of —OH group at 3,420 cm.$^{-1}$, of double bond at 1,640 cm.$^{-1}$, of ester bond at 1,720 cm.$^{-1}$, of Si—O—Si bond at 1,080 cm.$^{-1}$, and 1,040 cm.$^{-1}$, of —CH$_3$ group at 2,950 cm.$^{-1}$, 1,400 cm.$^{-1}$ and 1,300 cm.$^{-1}$, and of —Si—(CH$_3$)$_3$ group at 845 cm.$^{-1}$ The result of the elemental analysis was as follows:
Calculated for C$_{19}$H$_{42}$O$_7$Si$_3$: C 48.9%; H 9.0%. Found: C 47.2%; H 8.7%.

From the above results, it was confirmed that the product was methyldi(trimethylsiloxy)sylyl(propylglycerol)ethyleneglycol monomethacrylate (hereinafter referred to as S$_5$) (Reference Example 5).

The procedures of Reference Example 5 were repeated except that instead of methyldi(trimethylsiloxy)sylylpropyloxypropylene oxide, pentamethyldisiloxanylpropyloxypropylene oxide and tris(trimethylsiloxy)sylylpropyloxypropylene oxide were employed respectively to give pentamethyldisiloxanyl(propylglycerol)ethyleneglycol monomethacrylate (hereinafter referred to as S$_4$) (Reference Example 4) having the following formula [XIII]:

and tris(trimethylsiloxy)sylyl)propylglycerol)ethyleneglycol monomethacrylate (hereinafter referred to as S$_6$) (Reference Example 6) having the following formula [XIV]:

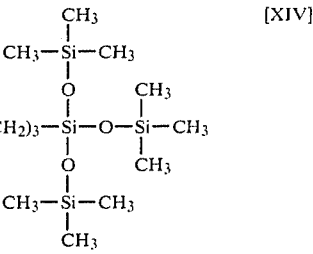

The analytical results of S$_4$ and S$_6$ compounds are shown in Table 1 together with the results of S$_5$ compound.

REFERENCE EXAMPLE 7

[Synthesis of Polysiloxanyl(alkylglycerol)polyalkyleneglycol Monomethacrylate]

Methyldi(trimethylsiloxy)sylyl(propylglycerol)diethyleneglycol monomethacrylate (hereinafter referred to as S$_7$) having the following formula [XV]:

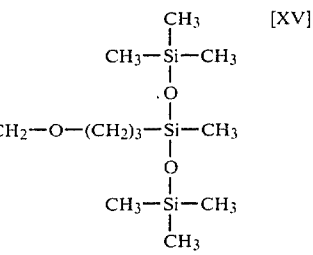

was prepared in the same manner as in Reference Example 5 except that diethylene glycol monomethacrylate was employed instead of ethylene glycol monomethacrylate.

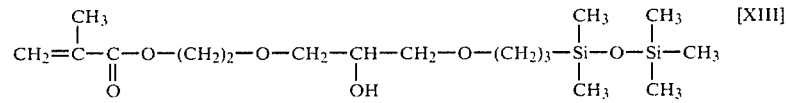

The analytical results of S$_7$ compound are shown in Table 1.

TABLE 1

| Organosiloxane monomer | S$_1$ | S$_2$ | S$_3$ | S$_4$ |
|---|---|---|---|---|
| Molecular formula | C$_{15}$H$_{32}$O$_5$Si$_2$ | C$_{17}$H$_{38}$O$_6$Si$_3$ | C$_{19}$H$_{44}$O$_7$Si$_4$ | C$_{17}$H$_{36}$O$_6$Si$_2$ |
| Molecular weight | 348 | 422 | 496 | 392 |
| Purity (%) | over 95 | over 98 | over 92 | over 94 |
| Specific gravity [d$_4^{20}$] | 0.965 | 0.989 | 1.009 | 0.970 |
| Refractive index [d$_D^{25}$] | 1.439 | 1.440 | 1.441 | 1.437 |
| Elemental analysis (%) | | | | |
| Calculated | C: 51.7 H: 9.2 | C: 48.3 H: 9.0 | C: 46.0 H: 8.9 | C: 52.0 H: 9.2 |
| Found | C: 53.8 H: 9.4 | C: 49.7 H: 9.3 | C: 45.1 H: 9.1 | C: 51.3 H: 9.3 |
| Infrared spectroscopy Absorption (cm.$^{-1}$): | | | | |
| Hydroxyl group | 3420 | 3420 | 3420 | 3420 |
| Double bond | 1640 | 1640 | 1640 | 1640 |
| Ester group | 1720 | 1720 | 1720 | 1720 |
| Polysiloxanyl group | 1175 | 1175 | 1175 | 1175 |
| | near 1050: 2 peaks | near 1050: 2 peaks | 1050 | near 1050: 2 peaks |
| | 850–800: 6 peaks | 850–800: 6 peaks | 850–800: 2 peaks | 850–800: 6 peaks |
| Appearance | slightly viscous, | slightly viscous, | slightly viscous, | slightly viscous, |

TABLE 1-continued

|  | colorless, transparent liquid | colorless, transparent liquid | colorless, transparent liquid | colorless, transparent liquid |
|---|---|---|---|---|
| Organosiloxane monomer |  | $S_5$ | $S_6$ | $S_7$ |
| Molecular formula |  | $C_{19}H_{42}O_7Si_3$ | $C_{21}H_{48}O_8Si_4$ | $C_{21}H_{46}O_8Si_3$ |
| Molecular weight |  | 466 | 540 | 510 |
| Purity (%) |  | over 93 | over 92 | over 91 |
| Specific gravity $[d_4^{20}]$ |  | 0.984 | 1.012 | 0.980 |
| Refractive index $[n_D^{25}]$ |  | 1.439 | 1.439 | 1.437 |
| Elemental analysis (%) |  |  |  |  |
| Calculated |  | C: 48.9 H: 9.0 | C: 46.7 H: 8.9 | C: 49.4 H: 9.0 |
| Found |  | C: 47.2 H: 8.7 | C: 48.1 H: 9.2 | C: 50.8 H: 9.3 |
| Infrared spectroscopy Absorption (cm.$^{-1}$): |  |  |  |  |
| Hydroxyl group |  | 3420 | 3420 | 3420 |
| Double bond |  | 1640 | 1640 | 1640 |
| Ester group |  | 1720 | 1720 | 1720 |
| Polysiloxanyl group |  | 1175 | 1175 | 1175 |
|  |  | near 1050: 2 peaks | 1050 | near 1050: 2 peaks |
|  |  | 850–800: 6 peaks | 850–800: 2 peaks | 850–800: 6 peaks |
| Appearance |  | slightly viscous, colorless, transparent liquid | slightly viscous, colorless, transparent liquid | slightly viscous, colorless, transparent liquid |

REFERENCE EXAMPLE 8

[Synthesis of Cross-Linking Agent Having Siloxane Bond; Polysiloxyanylbis(alkylglycerol Methacrylate)]

Tetramethyldisiloxyanylbis(propylglycerol methacrylate) having the following formula [XVI]:

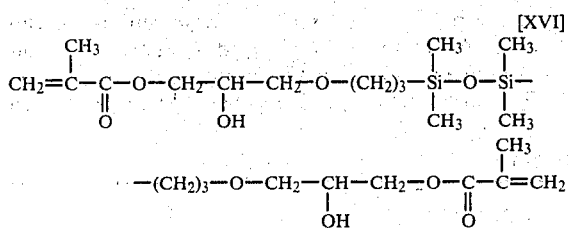

was prepared as follows:

A one liter four neck flask equipped with a stirrer, a thermometer, a tube for introducing nitrogen gas, a dropping funnel and a reflux condenser was charged with 362 g. of tetramethyldisiloxanylbis(propyloxypropylene oxide), 112 g. of potassium hydroxide and 2 g. of hydroquinone. With introducing nitrogen gas into the flask, 258 g. of methacrylic acid was added dropwise to the flask through the dropping funnel with stirring. After the completion of the addition, the mixture was gradually heated to 95° C. and at this temperature the reaction was carried out for about 20 hours. After the completion of the reaction, the reaction mixture was allowed to cool and was filtered to remove the precipitated potassium methacrylate. The filtrate was then dissolved in a large quantity of ether, and was washed several times with an aqueous solution of sodium hydroxide by employing a separatory funnel until the aqueous solution became colorless. After further washing with a saline water and then dehydrating by employing anhydrous sodium sulfate for a day and night, anhydrous sodium sulfate was removed by filtration and ether was distilled away to give the desired product.

The thus obtained product was a slightly viscous, colorless, transparent liquid. The specific gravity $d_4^{20}$ was 1.054 and the refractive index $n_D^{25}$ was 1.466.

The infrared absorption spectrum of the product indicated absorptions of —OH group at 3,420 cm.$^{-1}$, of double bond at 1,640 cm.$^{-1}$, of ester bond at 1,720 cm.$^{-1}$, of Si—O—Si bond at 1,050 cm.$^{-1}$, and of —Si—(CH$_3$)$_2$ at 1,260 cm.$^{-1}$ The result of the elemental analysis was as follows: Calculated for $C_{24}H_{46}O_9Si_2$: C 53.9%; H 8.6 %. Found: C 55.6%; H 8.9 % .

From the above results, it was confirmed that the product was tetramethyldisiloxyanylbis(propylglycerol methacrylate).

EXAMPLE 1

Forty grams of the $S_1$ monomer, pentamethyldisiloxanyl(propylglycerol) monomethacrylate, 55 g. of methyl methacrylate (hereinafter referred to as MMA), 5 g. of ethylene glycol dimethacrylate (hereinafter referred to as EDMA) and 0.2 g. of azobisisobutyronitrile were thoroughly admixed and then placed in a polypropylene test tube. After stoppering the test tube, under the ultraviolet irradiation the polymerization was carried out stepwise at 35° C., for 16 hours and at 50° C. for 8 hours, and then the ultraviolet irradiation was stopped and the thermal polymerization was further carried out stepwise at 70° C. for 6 hours, at 90° C. for 5 hours, at 110° C. for 5 hours and at 130° C. for 5 hours to give a hard, colorless, transparent rod.

Cutting, grinding and polishing of the thus obtained contact lens material were possible and the mechanical processing property was good.

The refractive index, specific gravity, oxygen permeability, visible ray percent transmission and Vickers hardness number were also measured.

The results are shown in Table 2.

EXAMPLES 2 to 7

The procedures of Example 1 were repeated except that $S_2$, $S_3$, $S_4$, $S_5$, $S_6$ and $S_7$ monomers were employed respectively instead of $S_1$ monomer.

The results are shown in Table 2.

TABLE 2

| Ex. No. | Monomer Organosiloxane monomer | Monomer (MMA) g. | Cross-linking agent (EDMA) | Appearance | Hardness | Processing property Cutting | Polishing |
|---|---|---|---|---|---|---|---|
| 1 | 40 ($S_1$) | 55 | 5 | colorless transparent | hard | good | good |
| 2 | 40 ($S_2$) | 55 | 5 | colorless transparent | hard | good | good |
| 3 | 40 ($S_3$) | 55 | 5 | colorless transparent | hard | good | good |
| 4 | 40 ($S_4$) | 55 | 5 | colorless transparent | hard | good | good |
| 5 | 40 ($S_5$) | 55 | 5 | colorless transparent | hard | good | good |
| 6 | 40 ($S_6$) | 55 | 5 | colorless transparent | hard | good | good |
| 7 | 40 ($S_7$) | 55 | 5 | colorless transparent | hard | good | good |

| Ex. No. | Refractive index $[n_D^{25}]$ | Specific gravity $[d_4^{20}]$ | Oxygen permeability ml · cm./cm.$^2$ sec · cmHg | Visible ray percent transmission % | Vickers hardness number |
|---|---|---|---|---|---|
| 1 | 1.4832 | 1.13 | $4.1 \times 10^{-10}$ | 98 | 11.2 |
| 2 | 1.4836 | 1.14 | $5.1 \times 10^{-10}$ | 98 | 10.9 |
| 3 | 1.4830 | 1.15 | $5.8 \times 10^{-10}$ | 97 | 10.4 |
| 4 | 1.4834 | 1.15 | $3.6 \times 10^{-10}$ | 98 | 10.3 |
| 5 | 1.4828 | 1.14 | $4.7 \times 10^{-10}$ | 98 | 9.8 |
| 6 | 1.4830 | 1.15 | $5.6 \times 10^{-10}$ | 97 | 9.6 |
| 7 | 1.4829 | 1.15 | $4.3 \times 10^{-10}$ | 97 | 9.7 |

EXAMPLE 8

Forty-five grams of the $S_2$ monomer, methyldi(trimethylsiloxy)sylyl (propylglycerol) monomethacrylate, 49 g. of MMA, 6 g. of trimethylolpropane trimethacrylate (hereinafter referred to as TMTMA) and 0.05 g. of azobisdimethylvaleronitrile were thoroughly admixed and then placed in a polypropylene test tube. After stoppering the test tube, the thermal polymerization was carried out stepwise at 32° C. for 48 hours, at 50° C. for 8 hours, at 70° C. for 6 hours, at 90° C. for 5 hours, at 110° C. for 5 hours and at 130° C. for 5 hours to give a hard, colorless, transparent rod.

The properties of the obtained copolymer are shown in Table 3.

EXAMLE 9 to 13

The procedures of Example 8 were repeated except that the $S_2$ monomer, MMA and TMTMA were employed in amounts shown in Table 3.

The properties of the obtained copolymers are shown in Table 3.

TABLE 3

| Ex. No. | Monomer $S_2$ monomer | Hydrophobic monomer (MMA) g. | Cross-linking agent (TMTMA) | Appearance | Hardness | Processing property Cutting | Polishing |
|---|---|---|---|---|---|---|---|
| 8 | 45 | 49 | 6 | colorless transparent | hard | good | good |
| 9 | 50 | 43 | 7 | colorless transparent | hard | good | good |
| 10 | 55 | 37 | 8 | colorless transparent | hard | good | good |
| 11 | 60 | 31 | 9 | colorless transparent | hard | good | good |
| 12 | 65 | 25 | 10 | colorless transparent | hard | good | good |
| 13 | 70 | 18 | 12 | colorless transparent | hard | good | good |

| Ex. No. | Refractive index $[n_D^{25}]$ | Specific gravity $[d_4^{20}]$ | Oxygen permeability ml · cm./cm$^2$ · sec · cmHg | Visible ray percent transmission % | Vickers hardness number |
|---|---|---|---|---|---|
| 8 | 1.482 | 1.13 | $6.4 \times 10^{-10}$ | 96 | 9.7 |
| 9 | 1.480 | 1.13 | $8.5 \times 10^{-10}$ | 96 | 8.4 |
| 10 | 1.478 | 1.12 | $11.3 \times 10^{-10}$ | 96 | 6.9 |
| 11 | 1.477 | 1.11 | $14.5 \times 10^{-10}$ | 95 | 5.7 |
| 12 | 1.476 | 1.10 | $19.2 \times 10^{-10}$ | 95 | 4.7 |
| 13 | 1.475 | 1.09 | $24.3 \times 10^{-10}$ | 94 | 3.7 |

EXAMPLE 14

Forty grams of the $S_2$ monomer, methyldi(trimethylsiloxy)sylyl(propylglycerol) monomethacrylate, 60 g. of MMA and 0.15 g. of azobisisobutyronitrile were thoroughly admixed and then placed in a polypropylene test tube. After stoppering the test tube, the thermal polymerization was carried out stepwise at 32° C. for 48 hours, at 50° C. for 8 hours, at 70° C. for 6 hours, at 90°

C. for 5 hours, at 110° C. for 5 hours and at 130° C. for 5 hours to give a hard, colorless, transparent rod.

The properties of the obtained copolymer are shown in Table 4.

EXAMPLES 15 to 19

The procedures of Example 14 were repeated except that the monomers shown in Table 4 were employed.

The properties of the obtained copolymers are shown in Table 4.

TABLE 4

| | Monomer | | | | | | Processing property | |
|---|---|---|---|---|---|---|---|---|
| | | Hydrophobic monomer | | | | | | |
| Ex. No. | $S_2$ monomer | MMA | CHMA* g. | Cross-linking agent EDMA | Appearance | Hardness | Cutting | Polishing |
| 14 | 40 | 60 | — | — | colorless transparent | hard | good | good |
| 15 | 50 | 50 | — | — | colorless transparent | hard slightly | good | good |
| 16 | 60 | 40 | — | — | colorless transparent | hard | good | good |
| 17 | 40 | — | 55 | 5 | colorless transparent | hard | good | good |
| 18 | 50 | — | 45 | 5 | colorless transparent | hard | good | good |
| 19 | 60 | — | 35 | 5 | colorless transparent | hard | good | good |

| Ex. No. | Refractive index $[n_D^{25}]$ | Specific gravity $[d_4^{20}]$ | Oxygen permeability ml · cm./cm² · sec · cmHg | Visible ray percent transmission % | Vickers hardness number |
|---|---|---|---|---|---|
| 14 | 1.485 | 1.13 | $5.0 \times 10^{-10}$ | 98 | 10.8 |
| 15 | 1.481 | 1.12 | $8.3 \times 10^{-10}$ | 98 | 9.3 |
| 16 | 1.478 | 1.11 | $14.2 \times 10^{-10}$ | 97 | 5.2 |
| 17 | 1.484 | 1.13 | $5.1 \times 10^{-10}$ | 98 | 10.9 |
| 18 | 1.480 | 1.12 | $8.4 \times 10^{-10}$ | 97 | 9.5 |
| 19 | 1.478 | 1.11 | $14.3 \times 10^{-10}$ | 97 | 5.5 |

*CHMA: Cyclohexyl methacrylate

EXAMPLE 20

Fifty-five grams of the $S_2$ monomer, methyldi(trimethylsiloxy)sylyl(propylglycerol) monomethacrylate, 40 g. of MMA, 5 g. of allyl methacrylate (hereinafter referred to as AMA) and 0.15 g. of azobisisobutyronitrile were thoroughly admixed and then placed in a polypropylene test tube. After stoppering the test tube, under ultraviolet irradiation the polymerization was carried out stepwise at 32° C. for 16 hours and at 50° C. for 8 hours, and then the ultraviolet irradiation was stopped and the thermal polymerization was further carried out stepwise at 70° C. for 6 hours, at 90° C. for 5 hours, at 110° C. for 5 hours and at 130° C. for 5 hours to give a hard, colorless, transparent rod.

The properties of the thus obtained copolymer are shown in Table 5.

EXAMPLES 21 and 22

The procedures of Example 20 were repeated except that the amounts of MMA and AMA were changed as shown in Table 5.

The properties of the obtained copolymers are shown in Table 5.

TABLE 5

| | Monomer | | | | | Processing property | | Refractive index $[n_D^{25}]$ | Specific gravity $[d_4^{20}]$ | Oxygen permeability ml · cm./cm² 19 sec · cm |
|---|---|---|---|---|---|---|---|---|---|---|
| Ex. No. | $S_2$ | Hydrophobic monomer (MMA) g. | Cross-linking agent (AMA) | Appearance | Hardness | Cutting | Polishing | | | |
| 20 | 55 | 40 | 5 | colorless transparent | hard | good | good | 1.497 | 1.12 | $11.6 \times 10^{-10}$ |
| 21 | 55 | 35 | 10 | colorless transparent | hard | good | good | 1.479 | 1.12 | $11.7 \times 10^{-10}$ |
| 22 | 55 | 30 | 15 | colorless transparent | hard | good | good | 1.478 | 1.12 | $12.0 \times 10^{-10}$ |

EXAMPLE 23

Twenty-five grams of the $S_1$ monomer, pentamethyldisiloxanyl(propylglycerol) monomethacrylate, 25 g. of the $S_2$ monomer, methyldi(trimethylsiloxy)sylyl(propylglycerol) monomethacrylate, 45 g. of MMA, 5 g. of TMTMA and 0.15 g. of azobisisobutyronitrile were thoroughly admixed and then placed in a polypropylene test tube. After stoppering the test tube, the thermal polymerization was carried out stepwise at 35° C. for 48 hours, at 50° C. for 8 hours, at 70° C. for 6 hours, at 90° C. for 5 hours, at 110° C. for 5 hours and at 130° C. for 5 hours to give a hard, colorless, transparent rod.

The properties of the thus obtained copolymer are shown in Table 6.

EXAMPLE 24 to 26

The procedures of Example 23 were repeated except that the organosiloxane monomer mixtures as shown in Table 6 were employed respectively instead of the $S_1$ and $S_2$ monomers.

The properties of the obtained copolymers are shown in Table 6.

TABLE 6

| Ex. No. | Monomer Organo-siloxane monomer | Hydro-phobic monomer (MMA) g. | Cross-linking agent (TMTMA) | Appearance | Hardness | Processing property Cutting | Polishing | Refractive index $[n_D^{25}]$ | Specific gravity $[d_4^{20}]$ | Oxygen permeability ml · cm./ cm$^2$ · sec · cmHg |
|---|---|---|---|---|---|---|---|---|---|---|
| 23 | S$_1$(25) S$_2$(25) | 45 | 5 | colorless transparent | hard | good | good | 1.479 | 1.13 | 7.6 × 10$^{-10}$ |
| 24 | S$_2$(25) S$_5$(25) | 45 | 5 | colorless transparent | hard | good | good | 1.478 | 1.12 | 8.1 × 10$^{-10}$ |
| 25 | S$_2$(25) S$_6$(25) | 45 | 5 | colorless transparent | hard | good | good | 1.480 | 1.12 | 9.2 × 10$^{-10}$ |
| 26 | S$_2$(25) S$_7$(25) | 45 | 5 | colorless transparent | hard | good | good | 1.479 | 1.12 | 7.7 × 10$^{-10}$ |

EXAMPLE 27

Forty grams of the S$_1$ monomer, pentamethyldisiloxanyl(propylglycerol) monomethacrylate, 10 g. of the cross-linking agent obtained in Reference Example 8, 50 g. of MMA and 0.2 g. of azobisdimethylvaleronitrile were thoroughly admixed and then placed in a polypropylene test tube. After stoppering the test tube, the termal polymerization was carried out stepwise at 35° C. for 40 hours, at 50° C. for 8 hours, at 70° C. for 6 hours, at 90° C. for 5 hours, at 110° C. for 5 hours and at 130° C. for 5 hours to give a hard, colorless, transparent rod.

The properties of the obtained copolymer are shown in Table 7.

EXAMPLES 28 to 33

The procedures of Example 27 were repeated except that S$_2$, S$_3$, S$_4$, S$_5$ and S$_6$ monomers were employed respectively instead of the S$_1$ monomer.

The results are shown in Table 7.

EXAMPLE 34

Forty-five grams of the S$_5$ monomer, methyldi(trimethylsiloxy)sylyl(propylglycerol)ethyleneglycol monomethacrylate, 49 g. of MMA, 6 g. of TMTMA and 0.2 g. of azobisdimethylvaleronitrile were thoroughly admixed and then placed in a polypropylene test tube. After stoppering the test tube, the thermal polymerization was carried out stepwise at 35° C. for 40 hours, at 50° C. for 8 hours, at 70° C. for 6 hours, at 90° C. for 5 hours, 110° C. for 5 hours and at 130° C. for 5 hours to give a hard, colorless, transparent rod.

The properties of the obtained copolymer are shown in Table 8.

EXAMPLES 35 to 39

The procedures of Example 34 were repeated except that the S$_5$ monomer, MMA and TMTMA were employed in amounts shown in Table 8.

The properties of the obtained copolymers are shown in Table 8.

TABLE 7

| Ex. No. | Monomer Organosiloxane monomer | Hydrophobic monomer (MMA) | Cross-linking agent (TMSBPGMA*) | Appearance | Hardness | Processing property Cutting | Polishing |
|---|---|---|---|---|---|---|---|
| 27 | 40 (S$_1$) | 50 | 10 | colorless transparent | hard | good | good |
| 28 | 40 (S$_2$) | 50 | 10 | colorless transparent | hard | good | good |
| 29 | 40 (S$_3$) | 50 | 10 | colorless transparent | hard | good | good |
| 30 | 40 (S$_4$) | 50 | 10 | colorless transparent | hard | good | good |
| 31 | 40 (S$_5$) | 50 | 10 | colorless transparent | hard | good | good |
| 32 | 40 (S$_6$) | 50 | 10 | colorless transparent | hard | good | good |
| 33 | 40 (S$_7$) | 50 | 10 | colorless transparent | hard | good | good |

| Ex. No. | Refractive index $[n_D^{25}]$ | Specific gravity $[d_4^{20}]$ | Oxygen permeability ml · cm./cm$^2$ · sec · cmHg | Visible ray percent transmission % | Vickers hardness number |
|---|---|---|---|---|---|
| 27 | 1.4827 | 1.09 | 4.5 × 10$^{-10}$ | 98 | 9.7 |
| 28 | 1.4831 | 1.10 | 5.6 × 10$^{-10}$ | 98 | 9.1 |
| 29 | 1.4836 | 1.11 | 6.3 × 10$^{-10}$ | 97 | 8.8 |
| 30 | 1.4821 | 1.09 | 4.1 × 10$^{-10}$ | 97 | 8.7 |
| 31 | 1.4824 | 1.10 | 5.1 × 10$^{-10}$ | 97 | 8.3 |
| 32 | 1.4828 | 1.11 | 6.1 × 10$^{-10}$ | 96 | 7.9 |
| 33 | 1.4827 | 1.11 | 5.6 × 10$^{-10}$ | 96 | 8.1 |

*TMSBPGMA: tetramethyldisiloxanylbis (propylglycerol methacrylate)

TABLE 8

| Ex. No. | Monomer S$_5$ monomer | monomer (MMA) g. | Cross-linking agent (TMTMA) | Appearance | Hardness | Processing property Cutting | Polishing |
|---|---|---|---|---|---|---|---|
| 34 | 45 | 49 | 6 | colorless transparent | hard | good | good |
| 35 | 50 | 43 | 7 | colorless transparent | hard | good | good |
| 36 | 55 | 37 | 8 | colorless transparent | hard | good | good |
| 37 | 60 | 31 | 9 | colorless transparent | hard | good | good |
| 38 | 65 | 25 | 10 | colorless transparent | hard | good | good |
| 39 | 70 | 18 | 12 | colorless transparent | hard | good | good |

| Ex. No. | Refractive index $[n_D^{25}]$ | Specific gravity $[d_4^{20}]$ | Oxygen permeability ml · cm./cm$^2$ · sec · cmHg | Visible ray percent transmission % | Vickers hardness number |
|---|---|---|---|---|---|
| 34 | 1.4812 | 1.13 | 5.8 × 10$^{-10}$ | 95.5 | 8.9 |
| 35 | 1.4790 | 1.12 | 7.7 × 10$^{-10}$ | 95 | 8.1 |
| 36 | 1.4770 | 1.12 | 10.2 × 10$^{-10}$ | 95 | 6.3 |
| 37 | 1.4758 | 1.10 | 13.1 × 10$^{-10}$ | 95 | 5.2 |
| 38 | 1.4631 | 1.09 | 17.3 × 10$^{-10}$ | 94.5 | 4.1 |
| 39 | 1.4736 | 1.08 | 21.9 × 10$^{-10}$ | 94 | 3.1 |

EXAMPLES 40 to 46

The procedure of Examples 1 to 7 were repeated except that the amounts of the monomers were changed as shown in Table 9.
The results are shown in Table 9.

EXAMPLES 47 to 53

The procedures of Examples 1 to 7 were repeated except that the amounts of the monomers were changed as shown in Table 10.
The results are shown in Table 10.

TABLE 9

| Ex. No. | Monomer Organosiloxane monomer g. | Hydrophobic monomer (MMA) g. | Cross-linking agent (EDMA) g. | Appearance | Hardness | Processing property Cutting | Polishing |
|---|---|---|---|---|---|---|---|
| 40 | 50 (S$_1$) | 43 | 7 | colorless transparent | hard | good | good |
| 41 | 50 (S$_2$) | 43 | 7 | colorless transparent | hard | good | good |
| 42 | 50 (S$_3$) | 43 | 7 | colorless transparent | hard | good | good |
| 43 | 50 (S$_4$) | 43 | 7 | colorless transparent | hard | good | good |
| 44 | 50 (S$_5$) | 43 | 7 | colorless transparent | hard | good | good |
| 45 | 50 (S$_6$) | 43 | 7 | colorless transparent | hard | good | good |
| 46 | 50 (S$_7$) | 43 | 7 | colorless transparent | hard | good | good |

| Ex. No. | Refractive index $[n_D^{25}]$ | Specific gravity $[d_4^{20}]$ | Oxygen permeability ml · cm./cm$^2$ · sec · cmHg | Visible ray percent transmission % | Vickers hardness number |
|---|---|---|---|---|---|
| 40 | 1.4791 | 1.12 | 6.9 × 10$^{-10}$ | 98 | 9.0 |
| 41 | 1.4879 | 1.13 | 8.7 × 10$^{-10}$ | 97 | 8.4 |
| 42 | 1.4789 | 1.13 | 9.6 × 1.$^{-10}$ | 97 | 8.1 |
| 43 | 1.4793 | 1.13 | 6.1 × 10$^{-10}$ | 98 | 8.0 |
| 44 | 1.4788 | 1.12 | 7.8 × 10$^{-10}$ | 97 | 7.9 |
| 45 | 1.4788 | 1.13 | 9.3 × 10$^{-10}$ | 96 | 7.7 |
| 46 | 1.4787 | 1.12 | 7.2 × 10$^{-10}$ | 96 | 7.6 |

TABLE 10

| Ex. No. | Monomer Organosiloxane monomer g. | Hydrophobic monomer (MMA) g. | Cross-linking agent (EDMA) g. | Appearance | Hardness | Processing property Cutting | Polishing |
|---|---|---|---|---|---|---|---|
| 47 | 60 (S$_1$) | 31 | 9 | colorless transparent | hard | good | good |
| 48 | 60 (S$_2$) | 31 | 9 | colorless transparent | hard | good | good |
| 49 | 60 (S$_3$) | 31 | 9 | colorless transparent | hard | good | good |

TABLE 10-continued

| Ex. No. | | | | | | | |
|---|---|---|---|---|---|---|---|
| 50 | 60 (S₄) | 31 | 9 | colorless transparent | hard | good | good |
| 51 | 60 (S₅) | 31 | 9 | colorless transparent | hard | good | good |
| 52 | 60 (S₆) | 31 | 9 | colorless transparent | hard | good | good |
| 53 | 60 (S₇) | 31 | 9 | colorless transparent | hard | good | good |

| Ex. No. | Refractive index $[n_D^{25}]$ | Specific gravity $[d_4^{20}]$ | Oxygen permeability ml · cm./cm² · sec · cmHg | Visible ray percent transmission % | Vickers hardness number |
|---|---|---|---|---|---|
| 47 | 1.4762 | 1.09 | 11.7 × 10⁻¹⁰ | 98 | 5.7 |
| 48 | 1.4768 | 1.11 | 14.7 × 10⁻¹⁰ | 97 | 5.4 |
| 49 | 1.4765 | 1.11 | 16.6 × 10⁻¹⁰ | 97 | 5.3 |
| 50 | 1.4764 | 1.12 | 10.3 × 10⁻¹⁰ | 98 | 5.2 |
| 51 | 1.4757 | 1.10 | 13.3 × 10⁻¹⁰ | 96 | 5.1 |
| 52 | 1.4761 | 1.11 | 16.0 × 10⁻¹⁰ | 96 | 5.0 |
| 53 | 1.4760 | 1.11 | 12.3 × 10⁻¹⁰ | 96 | 4.8 |

[Wearing Test of Contact Lenses]

The contact lens materials obtained in the foregoing Examples were classified into four groups with respect to the oxygen permeability, and were subjected to a usual mechanical processing to give contact lenses for rabbit eye having a base-curve of 7.90 mm., a front-curve of 8.10 mm., a lens size of 11.5 mm. and a center thickness being in inverse proportion to the oxygen permeability as shown in the following Table 11.

TABLE 11

| Oxygen permeability (ml · cm./ cm² · sec · cmHg) | Base-curve (mm.) | Front-curve (mm.) | Lens size (mm.) | Center thickness (mm.) |
|---|---|---|---|---|
| more than 15 × 10⁻¹⁰ | 7.90 | 8.10 | 11.5 | 0.2 to 0.3 |
| (10 to 15) × 10⁻¹⁰ | 7.90 | 8.10 | 11.5 | 0.15 to 0.2 |
| (5 to 10) × 10⁻¹⁰ | 7.90 | 8.10 | 11.5 | 0.08 to 0.15 |
| (2.5 to 5) × 10⁻¹⁰ | 7.90 | 8.10 | 11.5 | 0.05 to 0.08 |

The thus prepared contact lenses were worn on rabbit eyes continuously for 21 days, and observation of eye was conducted.

Contact lenses having a center thickness of not more than 0.25 mm., which were prepared from the lens materials having an oxygen permeability of more than 15×10⁻¹⁰ ml.cm./cm.²sec.cmHg, could be continuously worn without change in eyes.

Contact lenses having a center thickness of not more than 0.18 mm., which were prepared from the lens materials having an oxygen permeability of (10 to 15)×10⁻¹⁰ ml.cm./cm.²sec.cmHg, could be continuously worn without change in eyes.

Contact lenses having a center thickness of not more than 0.10 mm., which were prepared from the lens materials having an oxygen permeability of (5 to 10)×10⁻¹⁰ ml.cm./cm.²sec.cmHg, could be continuously worn without change in eyes.

Contact lenses having a center thickness of not more than 0.06 mm., which were prepared from the lens materials having an oxygen permeability of (2.5 to 5)×10⁻¹⁰ ml.cm./cm.²sec.cmHg, could be continuously worn without change in eyes.

From the above results, it would be further understood that the contact lens materials having an improved oxygen permeability are particularly suited for lens requiring a large lens thickness such as high-plus lens.

What we claim is:

1. A polymerization product consisting essentially of:
   (a) 30% to 95% of an organosiloxane monomer having the following general formula:

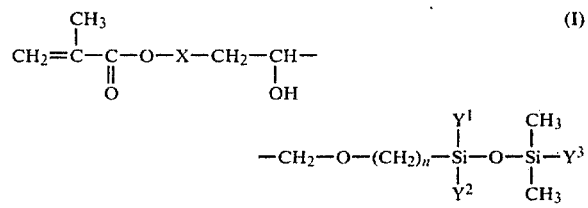

wherein:
   n is an integer of 1 to 3;
   X is $-\!\!+\!(CH_2)_p\!\!-\!\!O\!\!+_{\!q}\!$ in which p is an integer of 2 to 4 and q is 0 or an integer of 1 to 3; and
   Y¹, Y² and Y³ are methyl or —O—Si—(CH₃)₃; and
   (b) 70% to 5% of a hydrophobic methacrylic acid alkyl ester monomer, wherein said hydrophobic methacrylic acid alkyl ester monomer is at least one member selected from the group consisting of methyl methacrylate, ethyl methacrylate and cyclohexyl methacrylate, said % of (a) and (b) being % by weight based on the total weight of (a) and (b).

2. The polymerization product of claim 1, wherein said organosiloxane monomer is a compound having the following general formula (II):

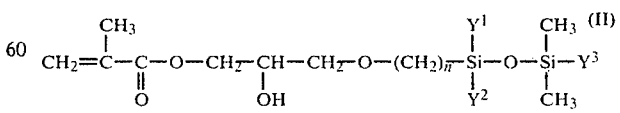

wherein n is an integer of 1 to 3, and Y¹, Y² and Y³ are methyl or —O—Si—(CH₃)₃.

3. The polymerization product of claim 1, wherein said organosiloxane monomer is a compound having the following general formula (III):

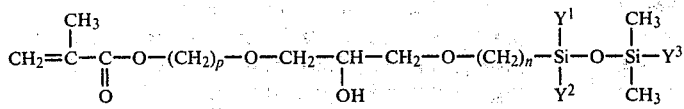

wherein n is an integer of 1 to 3, p is an integer of 2 to 4, and $Y^1$, $Y^2$ and $Y^3$ are methyl or $-O-Si-(CH_3)_3$.

4. The polymerization product of claim 1, wherein said organosiloxane monomer is a compound having the following general formula (IV):

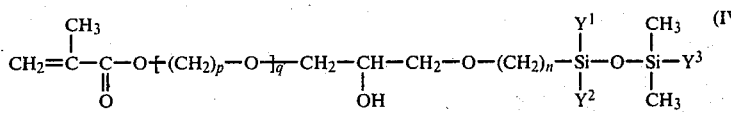

wherein n is an integer of 1 to 3, p is an integer of 2 to 4, q' is 2 or 3, and $Y^1$, $Y^2$ and $Y^3$ are methyl or $-O-Si-(CH_3)_3$.

5. The polymerization product of claim 1, having an oxygen permeability of $2.5 \times 10^{-10}$ to $43 \times 10^{-10}$ ml.cm./cm.$^2$sec.cmHg, a refractive index of $n_D{}^{25} = 1.40$ to 1.50, a specific gravity of $d_4{}^{20} = 1.01$ to 1.21, a visible ray percent transmission of not less than 90% and a Vickers hardness number of 1.5 to 19.0.

6. A polymerization product prepared by a process consisting essentially of polymerizing, in the presence of 0.5 to 25 parts of a cross-linking agent:
(a) 30% to 95% of an organosiloxane monomer having the following general formula (I):

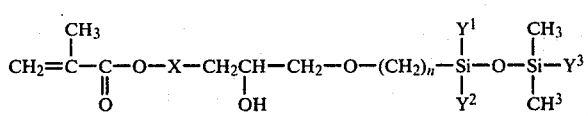

wherein:
n is an integer of 1 to 3;
X is $-[(CH_2)_p-O]_q-$ in which p is an integer of 2 to 4 and q is 0 or an integer of 1 to 3; and
$Y^1$, $Y^2$ and $Y^3$ are methyl or $-O-Si-(CH_3)_3$; and
(b) 70% to 5% of a hydrophobic methacrylic acid alkyl ester monomer, wherein said hydrophobic methacrylic acid alkyl ester monomer is at least one member selected from the group consisting of methyl methacrylate, ethyl methacrylate and cyclohexyl methacrylate, said % of (a) and (b) being % by weight based on the total weight of (a) and (b), said parts of the cross-linking agent being parts by weight per 100 parts by weight of component (a) plus component (b).

7. The polymerization product of claim 6 wherein said cross-linking agent is employed in an amount of 1 to 20 parts by weight per 100 parts by weight of the components (a) and (b).

8. The polymerization product of claim 6, wherein said cross-linking agent is at least one polyfunctional monomer selected from the group consisting of ethylene glycol diacrylate, ethylene glycol dimethacrylate, diethylene glycol diacrylate, diethyl glycol dimethacry-late, triethylene glycol diacrylate, triethylene glycol dimethacrylate, allyl methacrylate, trimethylolpropane trimethacrylate, divinyl benzene, diallyl phthalate, compounds having the following general formula (V):

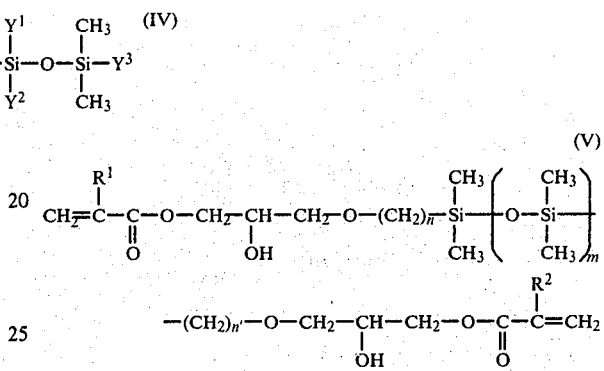

wherein n and n' are an integer of 1 to 3, m is 1 or 2, and $R^1$ and $R^2$ are hydrogen or methyl, and compounds having the following general formula (VI):

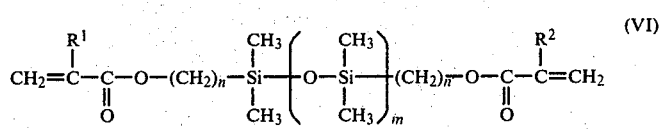

wherein n and n' are an integer of 1 to 3, m is 1 or 2, and $R^1$ and $R^2$ are hydrogen or methyl.

9. A contact lens made of a copolymer consisting essentially of:
(a) 30% to 95% of organosiloxane monomer units having the following general formula (I):

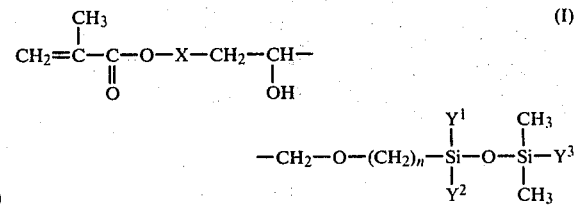

wherein:
n is an integer of 1 to 3;
X is $-[CH_2]_p-O]_q-$ in which p is an integer of 2 to 4 and q is 0 or an integer of 1 to 3; and
$Y^1$, $Y^2$ and $Y^3$ are methyl or $-O-Si-(CH_3)_3$; and
(b) 70% to 5% of hydrophobic methacrylic acid alkyl ester monomer units, wherein said hydrophobic methacrylic acid alkyl ester monomer is at least one member selected from the group consisting of methyl methacrylate, ethyl methacrylate and cyclohexyl methacrylate, said % of (a) and (b) being % by weight based on the total weight of (a) and (b).

10. A contact lens made of a copolymer consisting essentially of:
(a) 30% to 95% of organosiloxane monomer units having the following general formula (I):

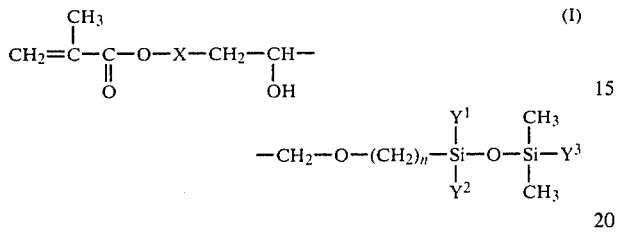

wherein:
n is an integer of 1 to 3;
X is $[(CH_2)_p—O]_q$ in which p is an integer of 2 to 4 and q is 0 or an integer of 1 to 3; and
$Y^1$, $Y^2$ and $Y^3$ are methyl or $—O—Si—(CH_3)_3$; and
(b) 70% to 5% of hydrophobic methacrylic acid alkyl ester monomer units, wherein said hydrophobic methacrylic acid alkyl ester monomer is at least one member selected from the group consisting of methyl methacrylate, ethyl methacrylate and cyclohexyl methacrylate, said % of (a) and (b) being % by weight based on the total weight of (a) and (b), wherein said copolymer further contains units of a cross-linking agent in a weight ratio of 0.5 to 25 against 100 of the components (a) and (b), said cross-linking agent being at least one polyfunctional monomer selected from the group consisting of ethylene glycol diacrylate, ethylene glycol dimethacrylate, diethylene glycol diacrylate, diethylene glycol dimethacrylate, triethylene glycol diacrylate, triethylene glycol dimethacrylate, allyl methacrylate, trimethylolpropane trimethacrylate, divinyl benzene, diallyl phthalate, compounds having the following general formula (V):

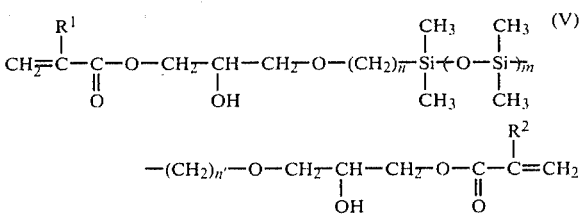

wherein:
n and n' are an integer of 1 to 3;
m is 1 or 2; and
$R^2$ and $R^2$ are hydrogen or methyl, and compounds having the following general formula (VI):

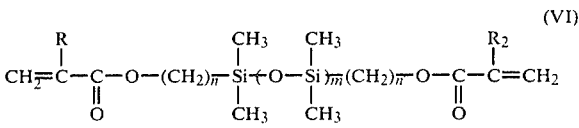

wherein:
n and n' are an integer of 1 to 3;
m is 1 or 2; and
$R^1$ and $R^2$ are hydrogen or methyl.

11. The contact lens of claim 9 or 10, wherein said copolymer has an oxygen permeability of $2.5 \times 10^{-10}$ to $43 \times 10^{-10}$ ml.cm./cm.$^2$sec.cmHg, a refractive index of $n_D{}^{25} = 1.40$ to $1.50$, a specific gravity of $d_4{}^{20} = 1.01$ to $1.21$, a visible ray percent transmission of not less than 90% and a Vickers hardness number of 1.5 to 19.0.

* * * * *